Oct. 26, 1937.    G. BOCK ET AL    2,097,386

ELECTRODE FOR ELECTRIC ARC WELDING

Filed May 31, 1935

G. Bock & E. Schröder
inventors

By: Glascock Downing Seebold
Attys.

Patented Oct. 26, 1937

2,097,386

UNITED STATES PATENT OFFICE 2,097,386

ELECTRODE FOR ELECTRIC ARC WELDING

Georg Bock and Edmund Schröder, Berlin, Germany

Application May 31, 1935, Serial No. 24,498
In Germany August 21, 1934

1 Claim. (Cl. 219—8)

This invention relates to electrodes for electric arc welding and has for its object to provide an electrode of this kind which will enable welds to be obtained having strength and ductility values and other properties which hitherto have been unobtainable or obtainable only with great difficulties.

When it has been intended hitherto to obtain special strength and ductility values with welding electrodes, it has been necessary suitably to alloy the rod for this purpose and to provide it with an envelope matched to the alloy and intended to bring this into the welding bath with as little alteration as possible. Owing to the fact that the principal alloy materials, e. g. manganese, and (particularly for high strength values) vanadium or molybdenum, burn away to a considerable extent during the welding operation, the alloying of the welding rod had always to be considerably higher than was intended to be achieved in the weld.

It is known, for example, that a rod 4 mm. thick which is to produce in the bath of metal temporarily fused in the welding a strength value obtainable with about ½% of manganese, requires an alloy containing 3½% of manganese, even if it is surrounded by a thick asbestos envelope. The thick envelope produces the additional defect that thick deposits of slag are formed upon the weld, and this brings about the limitation that such electrodes can only be utilized for welding almost exclusively in a horizontal position, so that work having welding seams in several directions must be turned over accordingly.

To protect the alloy materials from burning it has also been proposed to envelop electrodes in materials which, upon gasification, are supposed to evolve a protective gas.

Furthermore, electrodes have also been provided which were wound with several layers of paper, and again others which were wound with a layer of textile material and then immersed in a slag bath. Alloy materials, e. g. ferro-manganese, ferro-vanadium and the like, also silicon carbide, have also been added to the welding bath, and yet only uncertain and varying results have been obtained by all this considerable wasting of additional materials.

The invention affords the results aimed at, but not achieved by the known methods, with certitude and without loss of materials. Moreover it has the advantage that it melts almost without slag formation and may be utilized for welding in any position.

According to the invention an electrode for electric arc welding comprises a fusible rod, a gasifiable band carrying alloyable substance as a powder in concentrated form secured about the rod by a gasifiable adhesive, and a thin covering adapted to serve as a retort open towards the welding bath and concentrating the evolved gases thereon.

The covering layer may consist of a plastic mixture which becomes gas tight upon drying, such as finely ground oxide in water glass, with added substances for stabilizing the arc.

Preferably the band consists of paper or other cellulosic material and is wound helically upon the rod prior to the application of the covering. The band may be impregnated with substances such as fire protective substances, e. g. tungstates, for controlling the speed of gasification of the band.

A typical construction of the novel electrode is as follows:—

A band made of gasifiable material (e. g. paper, or a similar band of cellulose) is helically wound on the rod slightly to overlap, so that the convolutions of the band width are tightly closed in order to assure greater density. The band, which is thin, about .03 to .05 mm., or for baths to be carbonized up to .1 mm. thick, is first covered with a very thin layer of glue (e. g. vegetable glue) or with a very thin layer of resin, and carries with the aid of this adhesive layer a powdered alloy or de-oxidizing material, e. g. ferro-manganese, vanadium or chromium. How little of this is required is shown by the fact that after the application of the powder the paper loses only about one half of its transparency. The band is then wound on the rod with the metal powder in contact with the rod, only a thin stroke of adhesive being required to hold the band. Following the winding, the rod is immersed in a plastic mass which will become gas tight on drying and renders the outermost layer of paper incombustible, this being achieved by the addition of tungstates or similar fire protective materials. Slag envelopes which become porous when solidified are not employed, except with the addition of substances which will make them gas tight, i. e. materials utilized as solidifying agents which are also employed in colouring materials, e. g. colcothar, titanium white with additions of enamelling clay and the like. As is known in the art of enamelling, such mixtures form, if water glass is added, envelopes which become gas tight upon drying and remain gas tight in thin flowing molten condition, even if they contain additions to reduce scale formation, such as potassium nitrate, potassium manganate, potassium hydroxide and so forth, such addition being employed to render the electrode easily manageable for alternating current and to stabilize the arc.

The importance of the closed tubular shape for the jet of gas forming from the band is shown by the following:—If the paper, cellulose or other band is wound helically around the rod with a higher pitch than the width of the band, so that the edges of the band are not closed, then the weld loses very considerably in strength and ductility. The doubling of the quantity of the alloy material, or the doubling of the glue or paper layer makes no noticeable difference in this. The tubular gas jet is then no longer closed. The necessity of the gas tight envelope is shown in the same way. If the wound rod is immersed in masses which have the usual slag composition, then the quality of the weld deteriorates in a similar manner. Increasing the amount of the metal powder is only helpful in the case of quantities equal to about 20 to 30% of the weight of the envelope, this being considerably thicker. Increasing the quantity of the carbo-hydrate is only a chance remedy. Moreover, too large quantities of gas evolvers burst the strongest envelopes. The band, as already mentioned, is wound to overlap to assure with certitude that the tubular jet always remains closed.

An electrode constructed as aforesaid will produce with normal, unalloyed iron wire:—

Ductilities of 28–32%,
A bending angle of 180°,
A strength of 48 to 65 kg. per square millimetre.

Moreover, the weld is forgeable to needle fineness and the electrode melts with freedom from slag and may be used for welding in any position.

Hitherto these results were considered to be altogether impossible of achievement with an electrode containing a small amount of slag.

The electrode may be produced by machinery (winding machines) with perfect uniformity and it may be stored and shipped more readily than the known jacketed ones, while in addition it is cheaper and more economical.

In order that the differences between the new electrode and the known ones may be brought out more clearly, reference is made to the accompanying drawing.

Figure 1:
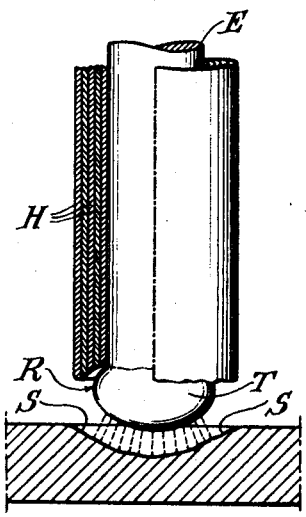
Figs. 1 and 2 are views partly in section of two known types of electrodes.

Fig. 1 of the drawing shows on an enlarged scale an electrode of known construction, namely a rod enveloped in several layers of paper band. The layers of paper band are usually stuck together by water glass. E indicates the electrode rod, H the layers of band, T the molten drop forming on the electrode. R indicates the edge zone of the drop, the effect of which will be described later and S indicates the edge zone of the welding bath.

Hitherto a thick paper envelope was employed for the purpose of surrounding the whole welding zone by protective gas. It will now be shown why this result could never be achieved with certainty.

The drop T usually starts with a diameter which corresponds to that of the rod and becomes quickly bigger tending to assume a spherical shape due to its surface tension. The edge zone R screens a thin zone of the envelope against the radiant heat of the molten bath. Therefore, in this zone the envelope is gasified somewhat regularly and moreover the drop absorbs some carbon at this point. Since, however, the thickness of the envelope considerably overhangs the edge zone of the drop, which amounts to 0.2 mm. at most, a large portion of the envelope is exposed to the entirely irregular radiant heat of the molten bath. It is therefore gasified irregularly, and under the formation of projections and irregular shapes provides a gas jet which gives off a certain amount of gas in quite uncontrolled radiation, a major part of this merely polluting the workshop. Moreover, the gas radiation obtainable from the edge zone R is disturbed by this uncontrolled radiation. Therefore, such electrodes will only give slightly improved results over and above the older arrangements in the case of quite regular forms of baths, e. g. when welding a simple seam.

Figure 2:
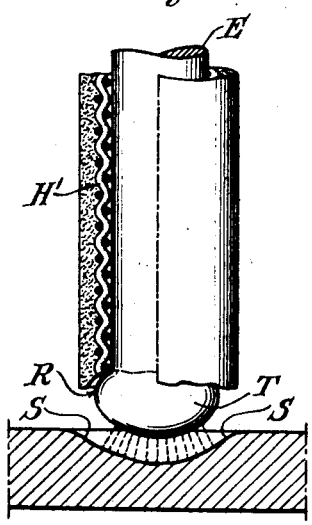

The same applies to an electrode constructed according to Fig. 2. This also illustrates a known arrangement. The electrode is first of all surrounded by a layer of textile material, e. g. a woven tube H', and is then immersed into a slag forming mass of known kind. Sometimes alloy material, such as ferro-manganese, is added to these masses. The foregoing arguments show why this addition is practically useless, since in the immediate vicinity of the rod, where the drop would be capable of dissolving the alloy material in the zone R, none or only a small part of the material is present. The evolution of the protective gas may be a little more regular, since it is directed by the outer side of the slag envelope. Due to the penetration by such slag, however, it becomes again irregular and moreover the thick envelope of slag is not stable enough and does not form a sufficiently regular shape to enable the directing of the gas jet.

Figure 3:
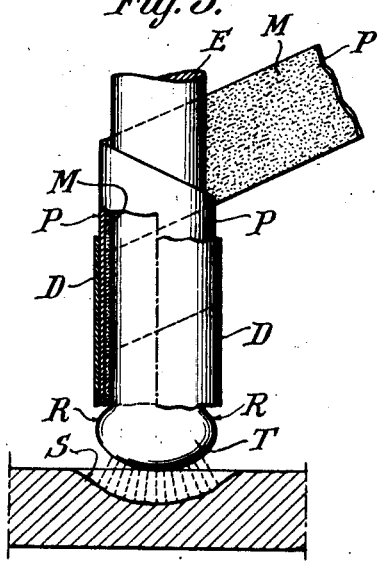
Figs. 3 and 4 are similar views of two forms of electrodes constructed in accordance with the invention.
Figure 4:
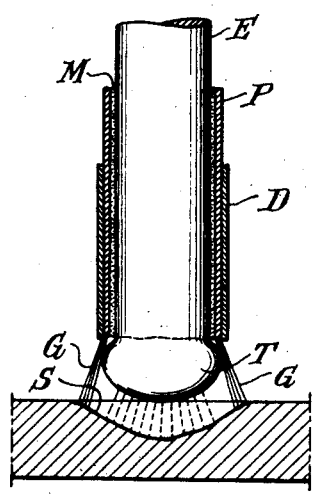

Figs. 3 and 4 show the new electrode. As shown in Fig. 3, the electrode rod is helically wound with a paper band P as mentioned above. The band carries a layer of alloy material indicated at M and presses same on to the rod E. D is the envelope which is intended to give the retort action, as has been termed in the description. R is again the edge zone of the molten drop T and S is the edge zone of the bath. In Figs. 3 and 4 the layers of the envelope are exaggerated in thickness to be shown clearly. As already mentioned, Figs. 1 and 2 are true to scale, but in the electrodes according to Figs. 3 and 4 the whole envelope, comprising the layers M, P and D, is mostly less than ½ mm. thick, as follows from the thickness of the paper and the thickness of the metal layer indicated above.

As will be seen in Figs. 3 and 4, the whole amount of the alloy material is in the dissolving zone of the drop, so that it is completely dissolved and transferred into the bath. The gasifiable layer P is so thin that this is also in the screening zone of the drop and therefore is regularly gasified. Therefore, the slight amount of gas evolved from the material may be generated within the thin coating D with sufficient certitude as in a retort open towards the bath, and the coating D is so little affected by the slight amount of gas that it extends right down to the active zone and guides the gas jet as a ring nozzle in such manner that the small amount of gas forms a tubular jet enveloping the melting area. This gas jet is indicated at G in Fig. 4.

The desiderata of steady and constant alloying of the rod and evolution of a constant stream of gas which is directed as a tubular jet to enclose the welding bath are thus achieved completely and with absolute certainty by an electrode according to the invention.

We claim:—

In a welding electrode the combination of an inner steel rod, an outer band of cellulose helically wound around said steel rod, and a layer of alloying metal covering that side of the band which is situated next the surface of the said rod, the combined thicknesses of the band of cellulose and of the layer of alloying metal being less than the difference between the greatest radius of the molten drop forming at the end of the electrode during welding and the radius of the said inner steel rod, an external incombustible and non-gasifiable mineral cover for the purpose of bringing the lower end of the band of cellulose into the screening zone of said drop.

GEORG BOCK.
EDMUND SCHRÖDER.